Figures 1, 2:
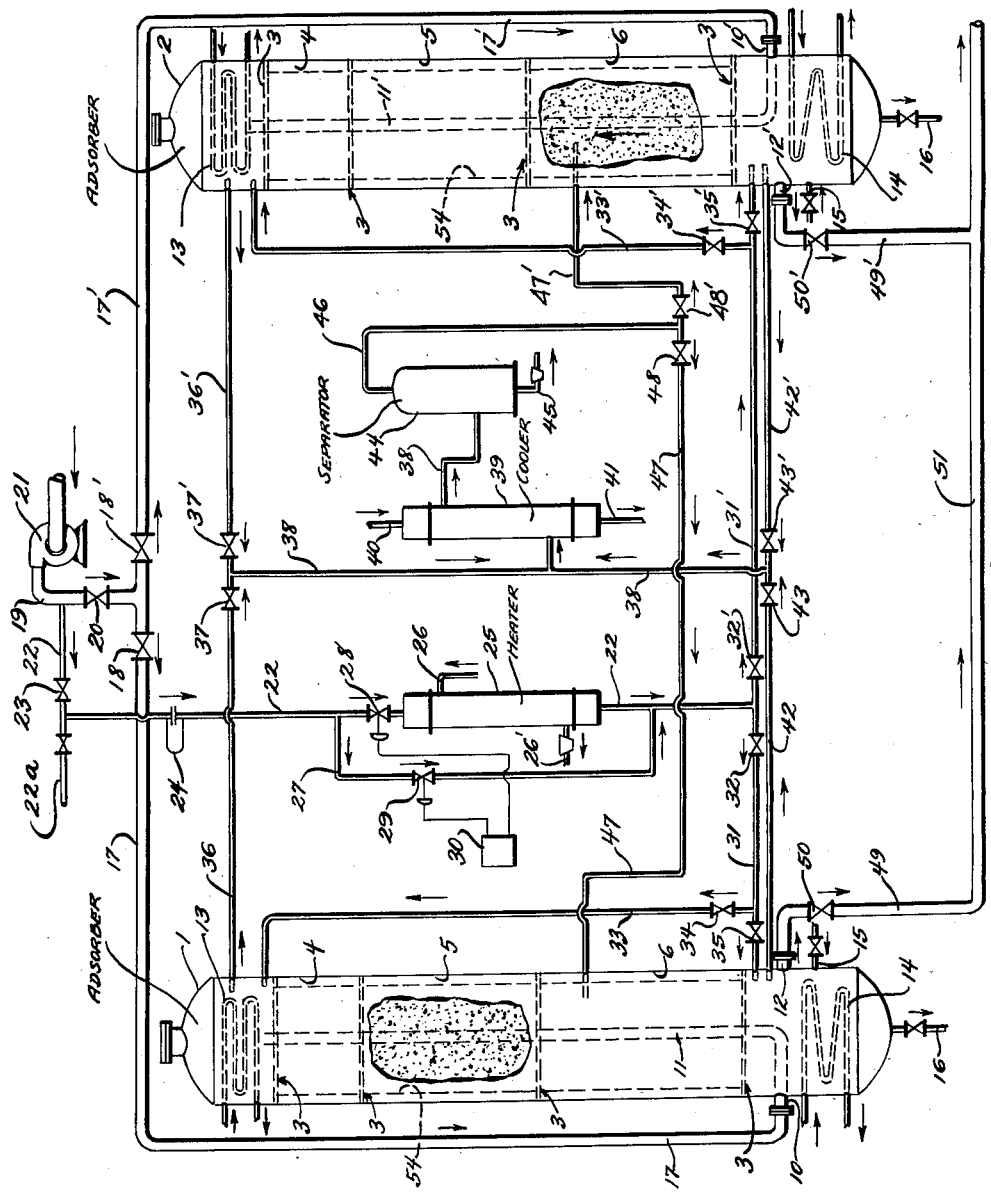

Oct. 3, 1944.   H. A. MARTIN ET AL   2,359,660
SYSTEM FOR REACTIVATING ADSORBENTS
Filed May 12, 1941

Henry A. Martin
Walter W. Deschner
INVENTOR

BY
ATTORNEY

Patented Oct. 3, 1944

2,359,660

UNITED STATES PATENT OFFICE 2,359,660

SYSTEM FOR REACTIVATING ADSORBENTS

Henry Arthur Martin, Kansas City, Mo., and Walter W. Deschner, Lawrence, Kans., assignors to J. F. Pritchard & Company, Kansas City, Mo., a corporation of Missouri Application May 12, 1941, Serial No. 393,081

5 Claims. (Cl. 183—4.7)

This invention relates to a method and apparatus for reactivating solid adsorbent materials which have been used for removing condensibles from gaseous mixtures, and particularly to a method and apparatus for reactivating solid adsorbent materials which have been used to remove water from gaseous mixtures.

When solid adsorbent materials are used for removing condensibles, such as oils and water, from gaseous mixtures, the adsorbents reach a practical limit of their sorptive capacities for the condensibles at periodic intervals and must then be reactivated to permit their re-use for additional adsorption of the condensibles. It is ordinarily preferable that such spent adsorbents be re-activated in place in the adsorbing vessels to a normal degree of sorptive efficiency, and with a minimum of interruption and disturbance to the adsorption operation. In adsorption systems which employ two or more adsorbing vessels in parallel, the common practice is to operate so that when the adsorbent charge in one vessel has become spent, the gaseous mixture may be transferred to another of the adsorbing vessels containing an active charge of adsorbent material, and while the gaseous mixture is being treated in the second adsorbing vessel, the spent charge in the first vessel is reactivated. In this way, the adsorption operation for removal of the condensible from the gaseous mixture is made continuous, although each individual adsorbing vessel is included only intermittently in the adsorption cycle, and when not in the adsorption cycle, is included in a reactivation cycle.

The present invention is directed particularly to such a multiple system and has for its principal object a novel reactivation method by which the reactivation cycle is operated in parallel to the adsorption cycle in a manner to effect reactivation of the adsorbents to a high degree of sorptive efficiency and without interruption and disturbance in the adsorption operation.

In accordance with the general embodiment of this invention, the raw gaseous mixture to be treated for removal of condensibles is fed to one of a pair of adsorber vessels containing an active charge of a suitable solid adsorbent, while the other containing spent adsorbent undergoes reactivation. The raw gas is ordinarily supplied to the active adsorber at some suitable system pressure which may be high or low, as may be determined by adsorption conditions, purposes for which the treated gas is to be utilized, pressure at which the raw gas is available, etc. As treatment of the raw gas proceeds in the active adsorber, a relatively minor portion of the raw gas is continuously diverted from the main stream going to the active adsorber. The diverted portion, under the system pressure is passed through a heater where it is heated to a relatively high temperature sufficient to effect removal of adsorbed condensible from the spent adsorbent. The heated gas is then passed through the inactive adsorber into contact with the spent adsorbent from which it removes the adsorbed condensibles. The resulting mixture of heated gas and removed condensibles is removed from the inactive adsorber and cooled to condense the removed condensible. The uncondensed gas, which is still saturated with condensible, its dew-point being the condensation temperature, is then passed into the active adsorber where it is re-mixed with the main gas stream and its dew-point reduced to that of the main gas stream by contact with the active adsorbent. An important feature of this invention resides in the introduction of the uncondensed gas into a final portion of the active adsorbent bed at a point where the pressure drops through the reactivation cycle and through the active adsorption cycle are substantially equalized. In this way, circulation of the diverted gas through the reactivation cycle is effected entirely under the system pressure without requiring any auxiliary boosting or compression equipment and is, at the same time denuded of condensibles to the same dew point as the main gas stream.

Another object is the provision of a novel arrangement of apparatus for effectively practicing the new process.

Other and more specific objects and novel features of this invention will be readily apparent from the following detailed description when read in conjunction with the accompanying drawing which illustrates one useful embodiment of this invention. It will be understood, however, that this invention is not to be limited to any particular form of apparatus or details of the steps of the method, but that various changes may be made in details but within the scope of the appended claims, without departing from the spirit of the invention.

In the drawing:

Figure 1 illustrates a flow plan of an arrangement of apparatus suitable for carrying out the method of this invention, and Fig. 2 illustrates a detail of the apparatus in an enlarged view.

Referring to the drawing, there is illustrated a pair of vertically disposed, tubular adsorption vessels 1 and 2, adapted to be operated in alternate adsorption and reactivation cycles. Each of the vessels is provided interiorly with a plurality of vertically spaced, horizontally disposed, perforate partition members, designated generally by the numeral 3. The spacing of partition members 3 may be equal or different depending upon the depth of the adsorbent beds to be placed between the members. The partition members 3 divide the vessels into a plurality of treating sections, numbered 4, 5 and 6 in order from top to bottom of the vessels. Each of the members 3 comprises a screen 7 (Fig. 2) of suitable mesh size, which is supported on an open grating 8, and these members are supported together on an annular lug 9 which is rigidly fastened to the inner wall of the vessel, as by welding or other suitable fastening means. Since the screens 7 and gratings 8 are both perforate, communication between the treating sections is thereby provided through the partition members 3.

Vessels 1 and 2 are provided with gas inlet connections 10 and 10', respectively, which enter the lower portions of the vessels beneath the lowermost partition members 3, and each of the inlet connections have connected thereto nozzles 11 and 11', respectively, which extend upwardly, substantially axially of the respective vessels to points therein above the uppermost partition members 3. The vessels are also provided with gas outlet connections 12 and 12', respectively, which communicate with the lower portions of the vessels below the lowermost partition members 3. Gas discharge pipes 49 and 49', respectively, provided with valves 50 and 50', respectively, are connected to outlet connections 12 and 12', and connect to a common header 51 which leads to a suitable point of disposal for the gas discharged from vessels 1 and 2.

In the upper portion of each of the vessels above the uppermost partition member 3, there is positioned a cooling coil 13 through which any suitable cooling fluid may be circulated, and in the lower portion of each of the vessels below the lowermost partition member, there is positioned a heating coil 14 through which any suitable heating fluid may be circulated. A valved liquid supply pipe 15 and a valved drain pipe 16 are connected into the lower portion of each of the vessels. A conduit 17, having a valve 18 interposed therein, is connected to inlet connection 10, and a conduit 17', having a valve 18' interposed therein, is connected to inlet connection 10'. Conduits 17 and 17' connect to a gas supply pipe 19, which is provided with a valve 20. A pump or compressor 21 is connected into pipe 19.

A pipe 22, provided with a valve 23, is connected to supply pipe 19 at a point between the valve 20 and compressor 21, and passes through a meter 24, and thence through a heater 25 of any suitable or conventional design, in heat-exchanging relationship with a suitable heating fluid, such as steam or other hot gases or liquids, which are circulated through heater 25 by means of inlet and outlet connections 26 and 26', respectively, for the purpose of heating the gases passing through the heater in pipe 22. A valved branch pipe 22a is connected into pipe 22 at a point between valve 23 and meter 24. A by-pass pipe 27 connects into pipe 22 on opposite sides of heater 25 and suitable control valves 28 and 29 are installed in a conventional manner in pipe 22 and by-pass pipe 27, respectively, under control of a conventional form of controller 30, to regulate the relative proportions of gases passing into the heater 25 through pipe 22 and through by-pass pipe 27. Pipe 22, after emerging from heater 25, connects into a pair of pipes 31 and 31', which connect into the lower portions of vessels 1 and 2, respectively, below the lowermost partition members 3. Pipes 31 and 31' are provided with block valves 32 and 32', respectively. Branch pipes 33 and 33' lead from pipes 31 and 31', respectively, to the upper portions of vessels 1 and 2, respectively, above the uppermost partition members 3 therein. Branch pipes 33 and 33' are provided with valves 34 and 34', respectively, and pipes 31 and 31' are provided with respective additional valves 35 and 35' which are interposed in their respective pipes at points between the points of connection thereto of branch pipes 33 and 33' and the vessels 1 and 2. A pair of pipes 36 and 36' provided, respectively, with valves 37 and 37', lead from the upper portions of vessels 1 and 2, respectively, to a pipe 38 which leads through a cooler 39 of any suitable or conventional design, in heat-exchanging relationship with a suitable cooling fluid, such as water, cold gas, etc., which is circulated through cooler 39 by means of inlet and outlet connections 40 and 41, respectively. A pair of pipes 42 and 42', provided with respective valves 43 and 43', lead from the lower portions of vessels 1 and 2, respectively, below the lowermost partition members 3, and connect into pipe 38. Pipe 38, after emerging from cooler 39, leads into a separator 44, provided with a bottom drain line 45, and an overhead discharge pipe 46, which connects to a pair of conduits 47 and 47', provided with valves 48 and 48', respectively. Conduits 47 and 47' connect to vessels 1 and 2, respectively, at points preferably in the lower portions of the respective vessels within the treating sections 6 thereof.

The above described apparatus is employed in the following manner in the reactivation of a solid adsorbent, the sorptive capacity of which has become reduced by the adsorption of a condensible, such as water, for example, from a gaseous mixture. For purposes of clarification and illustration, a more or less typical adsorption cycle for the removal of water from a gaseous mixture will first be described. Raw gas containing water, either in vapor form or as suspended droplets or both, and supplied from any suitable source, is pumped through pipe 19 by compressor 21 and discharged through pipe 17 into vessel 1. Valve 18 will be open and valve 18' closed at this stage of the operation. The raw gas travels through inlet connection 10 and nozzle 11 to the upper portion of the vessel 1 and there reverses its direction of flow, passing downwardly in succession through treating sections 4, 5 and 6 and out of the lower portion of the vessel through outlet connection 12 and discharge pipe 49 into header 51. Bodies of suitable adsorbent materials will be contained in sections 4, 5 and 6 and will act to remove the water from the gaseous mixture by adsorption. The adsorbent materials employed in vessel 1 may be of one kind or type in all of the treating sections, or different absorbents having different or preferential or selective sorptive capacities for water and other condensibles or impurities in the gas, may be used in each of the treating sections. The passage of the raw gaseous mixture through vessel 1 is continued until the adsorbent materials in the treating sections are saturated with water to a point of reduced efficiency such that reactivation of the adsorbent material becomes necessary to restore the adsorbents to their normal state of efficiency. Thereupon valves 18' and 50' are opened and valves 18 and 50 closed, thus transferring the main stream of raw gases to vessel 2, which, as indicated, is identical in construction with vessel 1, as well as in the type and arrangement of adsorbent materials therein. The flow of raw gas is conducted through vessel 2 in the previously described manner, while the adsorbents in vessel 1 are reactivated in the manner to be hereinafter described. After vessel 1 has been reactivated, the main gas stream is again returned to vessel 1 while vessel 2 is then subjected to reactivation. This alternation of vessels 1 and 2 in the adsorption and reactivation cycles allows both cycles to proceed continuously in parallel.

While the raw gas stream is passing through vessel 2, a comparatively small portion of this stream is continuously diverted through pipe 22 from the main stream in pipe 19, the volume of the diverted stream being regulated by means of meter 24. The diverted gas flows through heater 25 where it is heated by means of high temperature steam or gas or by some other suitable heated fluid, circulated through the heater by means of connections 26 and 26'. The heated gas then flows through pipe 31 into the lower portion of vessel 1 and flows upwardly therein through the spent adsorbent materals. The temperature to which the gas will be heated in heater 25 will be sufficiently high to cause the gas to vaporize or otherwise remove the water or other condensible present in the adsorbent materials. The water, either in the form of vapor or in suspension will be commingled with the heated gas and carried upwardly therewith to the upper portion of vessel 1. The mixture of heated gas and removed water will discharge from the upper portion of vessel 1 through pipe 36, valve 37' being closed, and will flow through pipe 38 and thence through cooler 39. The mixture will be cooled in passage through cooler 39 by a suitable cooling fluid, such as cold water, circulated through the cooler by means of connections 40 and 41, to a suitable temperature at which condensation of the major portion of the water contained in the reactivation gas will occur. The cooled mixture emerging from cooler 39 will enter separator 44 where the condensed water will separate from uncondensed gas. The separated water will be discharged from the system through pipe 45. The dew-point of the uncondensed gas, of course, will be the temperature of the cooled gas stream, and the gas will normally still contain some water which it is desirable to remove in order to thoroughly dry the reactivation gas and further reduce its dew-point. The still wet uncondensed gas, therefore, will be discharged from separator 44 through pipe 46 and conveyed thereby into pipe 47', valve 48 being closed at this point, and is discharged into section 6 of vessel 2, where it is re-mixed with the main stream of gas undergoing final dehydration in vessel 2.

By introducing the cooled, partially dehydrated reactivation gas into the lower portion of the active adsorption bed in vessel 2, the reactivation gas will be further dehydrated to the desired dew-point by the final portion of the bed. The selection of a point in the lower portion of the adsorbent bed for introduction of the reactivation gas permits balancing of the pressure drops through the adsorption and reactivation cycles so that no additional boosting or compression equipment is required for circulation of the reactivation gas through its cycle. Since only a relatively small proportion of the total gas stream is employed in the reactivation cycle, the pressure drop in the latter will be quite small despite the increased temperatures and friction loss in the heating and cooling equipment and connections. By introducing the reactivation gas into the final section only of the bed of active adsorbent, the pressure drop in the reactivation cycle will not be made additive to that in the main adsorbent cycle and the pressure drops in both cycles may thus be readily balanced by introduction of the reactivation gas into the final portion of the adsorbent bed. The reactivation gas thus may be circulated through the reactivation system under the same pressure and by the same pressure source as is employed for forcing the main gas stream through the adsorption system.

Whn reactivation of the material in vessel 1 is complete and the material in vessel 2 reaches the stage requiring reactivation, the several valves and connections are reversed in order to re-connect vessel 1 into the adsorption cycle, while vessel 2 is connected into the reactivation cycle. That is, valves 18 and 50 are opened, while valves 18' and 50' are closed, re-admitting the main gas stream to vessel 1 and withdrawing it from vessel 2. Valves 32, 37 and 48' are closed, while valves 32', 37' and 48 are opened, sending the reactivation gas from pipe 22 through heater 25 into the reactivation circuit including pipe 31', vessel 2, pipes 36' and 38, cooler 39, separator 44, pipe 46, pipe 47 and section 6 of vessel 1.

By means of the branch pipes 33 and 33', and pipes 42 and 42', the hot reactivation gases may be directed downwardly through the adsorbent beds instead of upwardly as previously described. While the upward flow is ordinarily to be preferred, the downward flow may also be used successfully when conditions so warrant.

With the reactivation cycle operated in the manner described, the entire system may be operated under any desired pressure with equal advantage and without complication in the operation.

The temperature of reactivation will depend upon the pressure, the heating facilities available, the volume of heating gases employed, the amount of condensible to be removed from the adsorbents, and the rate at which the condensible is to be removed. The volume of reactivation gas ordinarily used will range from about 5 to 15 percent of the volume of the main gas stream, but may be more or less depending upon one or more of the other conditions referred to. The temperature, where water is the condensible being removed, will generally range from about 250° F. to 350° F., but may be higher or lower depending upon the pressure, the heating facilities, reactivation rate, etc.

In ordinary practice of the reactivation cycle, assuming a 10 hour adsorption cycle, the hot reactivation gases will be passed through the spent adsorbent for about 4 hours. Thereafter, the application of heat to the reactivation gas is dis-continued and cold gas is passed through the adsorbent for about 3 hours more, which permits a "rest" period for the reactivated adsorbent of about three hours. These periods may be varied, of course, depending upon the various conditions encountered and the specific periods mentioned are cited by way of example.

To control the temperature of the reactivation gases, by-pass pipe 27 is employed, and by proper manipulation of control valves 28 and 29 in accordance with the temperature conditions, this operation being effected automatically, as a rule, by means of an automatic controller such as controller 30, a portion of the relatively cold reactivation gas may be by-passed around heater 25 and the temperature of the gas entering the spent adsorbent beds is thereby controlled as desired.

In another modification, an independent source of reactivation gas may be employed. In this case, valve 23 in pipe 22 is closed and the gas introduced into pipe 22 from such independent source through pipe 22a. However, such extraneous gas will travel through the same reactivation cycle previously described and will be mixed with the main stream of gas passing through the adsorption cycle in the lower portion of the active adsorption bed. Such extraneous gas will, of course, be supplied at a pressure which will equal that in the system so that it may readily enter the active adsorber under the pressure prevailing therein.

By still another modification, additional reactivation steps may be employed. In many cases the raw gases will contain other condensibles which are not readily removable from the spent adsorbents by the reactivation gas alone. For example, a gas which contains water as the principal condensible may also contain small quantities of condensible hydrocarbons such as lubricating oil and mineral seal oil vapors, which are not readily removable from the adsorbents by the reactivation gas employed for removing water, particularly at the temperature normally used for the removal of water. Sulfur compounds constitute another impurity found in various gases. These various impurities normally are preferentially adsorbed by the adsorbent materials and collect in the upper portions of the adsorbent beds, ordinarily, the remainder of the beds then adsorbing the water from the gases. The impurities are preferably removed, in accordance with this invention, by a novel step of washing the adsorbent bed with a solvent for these impurities prior to or following the step of contacting the bed with the hot reactivating gas. This modification of the present invention is performed in the following manner: When vessel 1, for example, is placed in the reactivation cycle, a suitable solvent, such as butane, light naphtha, benzene, or other similar material is introduced into the lower portion of the vessel through pipe 15. The solvent is preferably one which is substantially lower boiling than the condensible impurities upon which it is to act and is also one which preferably has little solvent capacity for water under the conditions of the process. Generally speaking, any low boiling hydrocarbon material boiling below about 250° F. is suitable for this purpose.

Heating fluid is circulated through coil 14 and the solvent heated to its vaporizing temperature under the particular pressure under which the system is maintained. The hot solvent vapors then travel upwardly through the spent adsorbent bed until they strike the surfaces of the cooling coil 13, through which a suitable cooling fluid, such as water, is circulating. The vapors thereupon condense and drain back into the bed where they act to dissolve the adsorbed impurities. As the condensed solvent sinks through the bed, it contacts the hot vapors traveling upwardly and a dephlegmating action occurs in the body of the adsorbent material, producing a plurality of recurrent vaporizations and condensations on the surfaces of the adsorbent particles. Since adsorption is primarily a surface phenomenon, the adsorbed impurities will normally be present on the surfaces of the particles which are exposed to the dephlegmating solvent and the solvent action will be rendered most effective thereby. As the solvent and dissolved impurities drain back to the bottom of the vessel, the lower boiling solvent will be revaporized continuously by the heat applied thereto, which will be insufficient to vaporize the higher boiling impurities and these will, therefore, remain in the bottom of the vessel and accumulate throughout the washing operation. When the bed has been thus thoroughly washed, the application of heat to the solvent is discontinued and the accumulated washings will be withdrawn from the bottom of vessel 1 through pipe 16.

Following the washing step, reactivation of the main body of adsorbent is then accomplished by contact with the hot reactivation gas in the manner previously described. The hot gases will also remove any traces of solvent and impurities remaining in the bed and these will be relatively so minute in amount that they will have no detrimental effect when later mixed with the main stream of dehydrated gas.

It will be understood that the nature of the solvent, temperatures employed, time of washing, etc., are all variable depending upon the nature of the impurities and the particular conditions encountered in each case.

The apparatus heretofore described may include an additional feature which is found to be useful in many cases. In the reactivation of the adsorbents in the manner described, the temperatures employed, as noted previously, may be of the order of 300 to 350° F. Due to the large amount of surface in the vessels exposed to these temperatures, substantial loss of heat to the vessel will generally occur with resultant expansion and contraction stresses in the vessel and reduced efficiency in reactivation. To overcome these disadvantageous conditions, the interior of vessels 1 and 2 may be provided with an insulating lining, a fragment of which is illustrated in Fig. 2. This lining consists of a circular metal liner 54 of smaller diameter than the interior of the vessels, thereby providing an annular space 55 between the liner and the wall of the vessel for the reception of a suitable insulating material. The length of the liner may extend continuously throughout the vessel, or as illustrated in Fig. 2, may be made in sections having lengths substantially equal to the lengths of the several sections 4, 5 and 6. In the latter case, the bottoms of each of the annular spaces 55 is closed by an annular plate 56 which is welded or otherwise conveniently attached to the inner wall of the vessel. The top of each annular space 55 is left open and the space is then packed with any suitable heat-insulating material 57. This may most conveniently be some of the same adsorbent material employed in the respective sections, since almost all such materials have excellent heat-insulating properties, and the material may be introduced into the annular spaces at the time the sections are charged with adsorbent materials.

It will be understood that the reactivation method of this invention may be applied with equal advantages to the reactivation of solid adsorbents which have been employed for removing condensibles other than water from gaseous mixtures, by variation, primarily, in the conditions of treatment to suit the particular material to be removed from the spent adsorbents.

What we claim and desire to secure by Letters Patent is:

1. In an adsorption system employing a plurality of adsorption zones for removing water and condensible hydrocarbons from a gaseous mixture by contacting said mixture with solid adsorbents contained in said zones and wherein said zones are alternated in the system between active adsorption and reactivation positions, the method of reactivating spent adsorbent materials used in the system, comprising, introducing a low-boiling solvent for said hydrocarbons into a zone undergoing reactivation, dephlegmating said solvent in contact with the body of spent adsorbent material in said reactivation zone to thereby selectively dissolve said hydrocarbons in said solvent and remove them from said adsorbent material, withdrawing the resulting solution from said reactivation zone, thereafter diverting a portion of the gaseous mixture from the main stream thereof going to an active adsorption zone, heating the diverted portion to a temperature sufficient to effect removal of water from the spent adsorbent material, flowing the heated portion through said reactivation zone into contact with said spent adsorbent material to thereby remove the water therefrom, withdrawing the resulting mixture of heated gas and water from said reactivation zone, cooling said resulting mixture to condense the removed water, separating the water from uncondensed gas, and passing the uncondensed gas into contact with a final section only of a bed of active adsorbent material in said active adsorbent zone.

2. In an adsorption system employing a plurality of adsorption zones for removing condensibles from a gaseous mixture by contacting said mixture with solid adsorbents contained in said zones and wherein said zones are alternated in the system between active adsorption and reactivation positions, the method of reactivating the spent adsorbent materials, comprising, diverting a portion of the gaseous mixture from the main stream thereof going to an active adsorption zone, heating the diverted portion to a temperature sufficient to effect removal of adsorbed condensibles from spent adsorbent materials used in the system, flowing the heated portion through a zone undergoing reactivation into contact with spent adsorbent material to thereby remove the adsorbed condensible therefrom, withdrawing the resulting mixture of the heated gas and removed condensible from the reactivation zone, cooling said resulting mixture to produce condensation of the condensible, separating the condenser material from uncondensed gas, passing the uncondensed gas into contact with a final section of a bed of active adsorbent material in said active adsorption zone at a point therein where the pressure drops through the reactivation cycle and through said active adsorption zone have been substantially equalized.

3. Apparatus for reactivating spent adsorbent which has been employed for removing condensibles from a gaseous mixture, comprising, a raw gas supply conduit, a treated gas discharge conduit, first and second adsorbers connected in parallel to both said conduits, said first adsorber containing a body of spent adsorbent and said second adsorber containing a body of active adsorbent, means to disconnect said first adsorber from said main stream of raw gas passing through both said conduits, means for diverting a portion of the raw gas from the main stream thereof passing to said second adsorber, means for heating the diverted portion, means for introducing the diverted portion after heating into contact with the body of said spent adsorbent in said first adsorber to thereby remove adsorbed condensibles from the spent adsorbent, means for withdrawing the resulting gaseous mixture containing the removed condensibles from said first adsorber, means for cooling said mixture to effect condensation of said condensibles, means for separating the resulting condensate from the uncondensed portion of said mixture, and means for introducing said uncondensed portion into said second adsorber into contact with a final portion only of said body of active adsorbent therein, at a point where the pressure drop through the path of flow of the diverted portion substantially equals the pressure drop in the main stream at the point where the uncondensed gas stream joins the main stream in said final portion of active adsorbent.

4. In an adsorption system employing a plurality of adsorption zones for removing condensibles from a gaseous mixture by contacting said mixture with solid adsorbents contained in said zones and wherein said zones are alternated in the system between active adsorption and reactivation positions, the method of reactivating the spent adsorbent materials, comprising, introducing into a zone undergoing reactivation a selective solvent for a selected component of said condensibles, dephlegmating said solvent in contact with the spent adsorbent material in said zone, removing the resulting solution from the zone, thereafter diverting a portion of the gaseous mixture from the main stream thereof going to an active adsorption zone, heating the diverted portion to a temperature sufficient to effect removal of adsorbed condensibles from spent adsorbent material used in the system, flowing the heated portion through said zone undergoing reactivation into contact with spent adsorbent material to thereby remove the remaining adsorbed condensibles therefrom, withdrawing the resulting mixture of the heated gas and removed condensible from the reactivation zone, cooling the resulting mixture to produce condensation of the condensibles, separating the condensed material from uncondensed gas, and passing the uncondensed gas into contact with a final section only of a bed of active adsorption material in said active adsorption zone.

5. In an adsorption system employing a plurality of adsorption zones for removing water from a gaseous mixture by contacting said mixture with solid adsorbents contained in said zones, and wherein said zones are alternated in the system between active adsorption and reactivation positions, the method of reactivating the spent adsorbent materials, comprising, initially removing adsorbed impurities other than water from the spent adsorbent material by contacting said spent adsorbent material under dephlegmating conditions with a selective solvent for said adsorbed impurities, removing the resulting solution from said reactivation zone, thereafter diverting a portion of the gaseous mixture from the main stream thereof going to an active adsorption zone, heating the diverted portion to a temperature sufficient to effect removal of adsorbed water from the spent adsorbent material used in the system, flowing the heated portion through the zone undergoing reactivation into contact with said spent adsorbent material to thereby remove the adsorbed water therefrom, withdrawing the resulting mixture of the heated gas and removed water from the reactivation zone, cooling said resulting mixture to condense said water, separating the water from uncondensed gas, and passing the uncondensed gas into contact with a final portion only of a bed of active adsorbent material in said active adsorption zone.

HENRY ARTHUR MARTIN.
WALTER W. DESCHNER.